July 1, 1941.  W. W. REESE  2,247,712

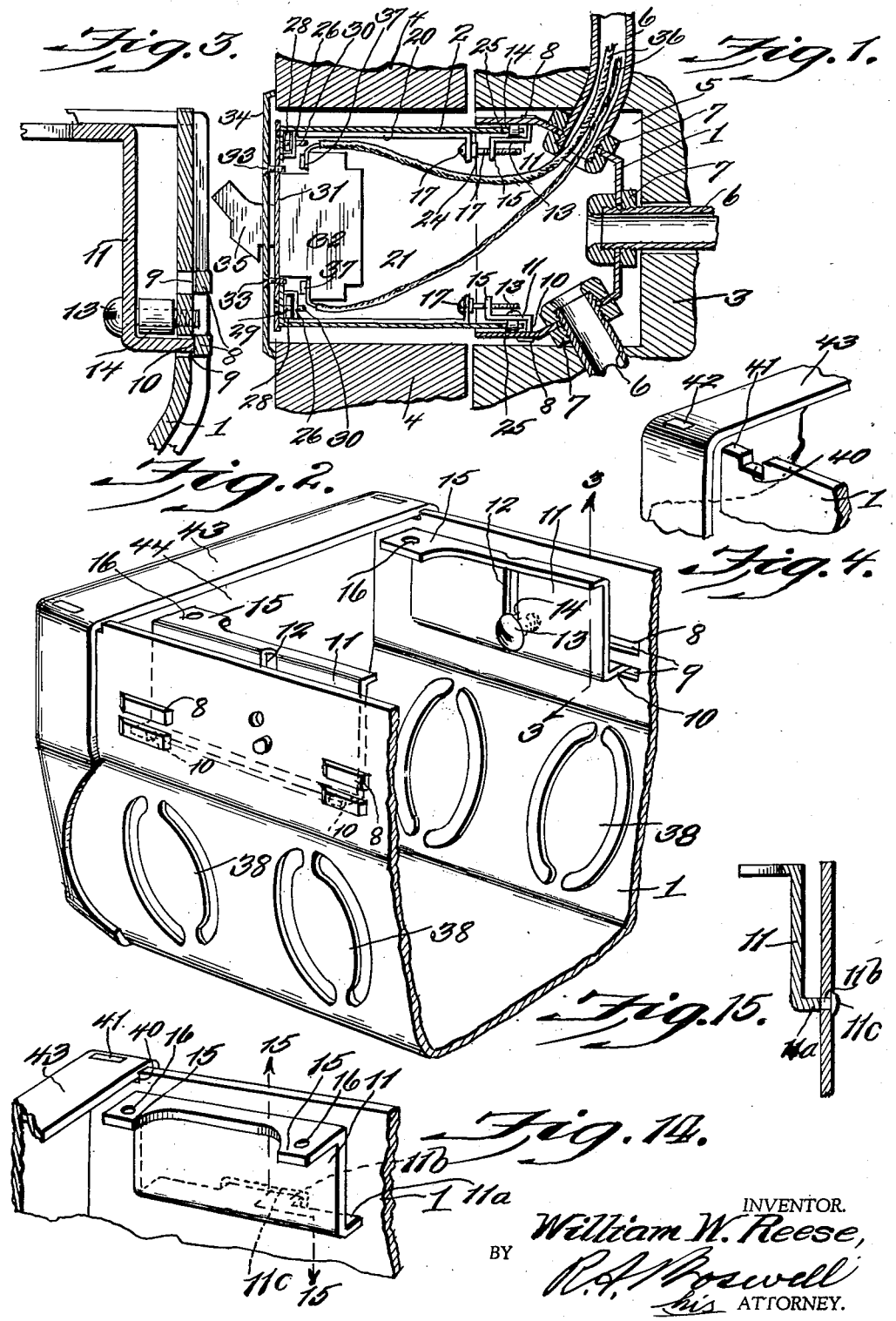

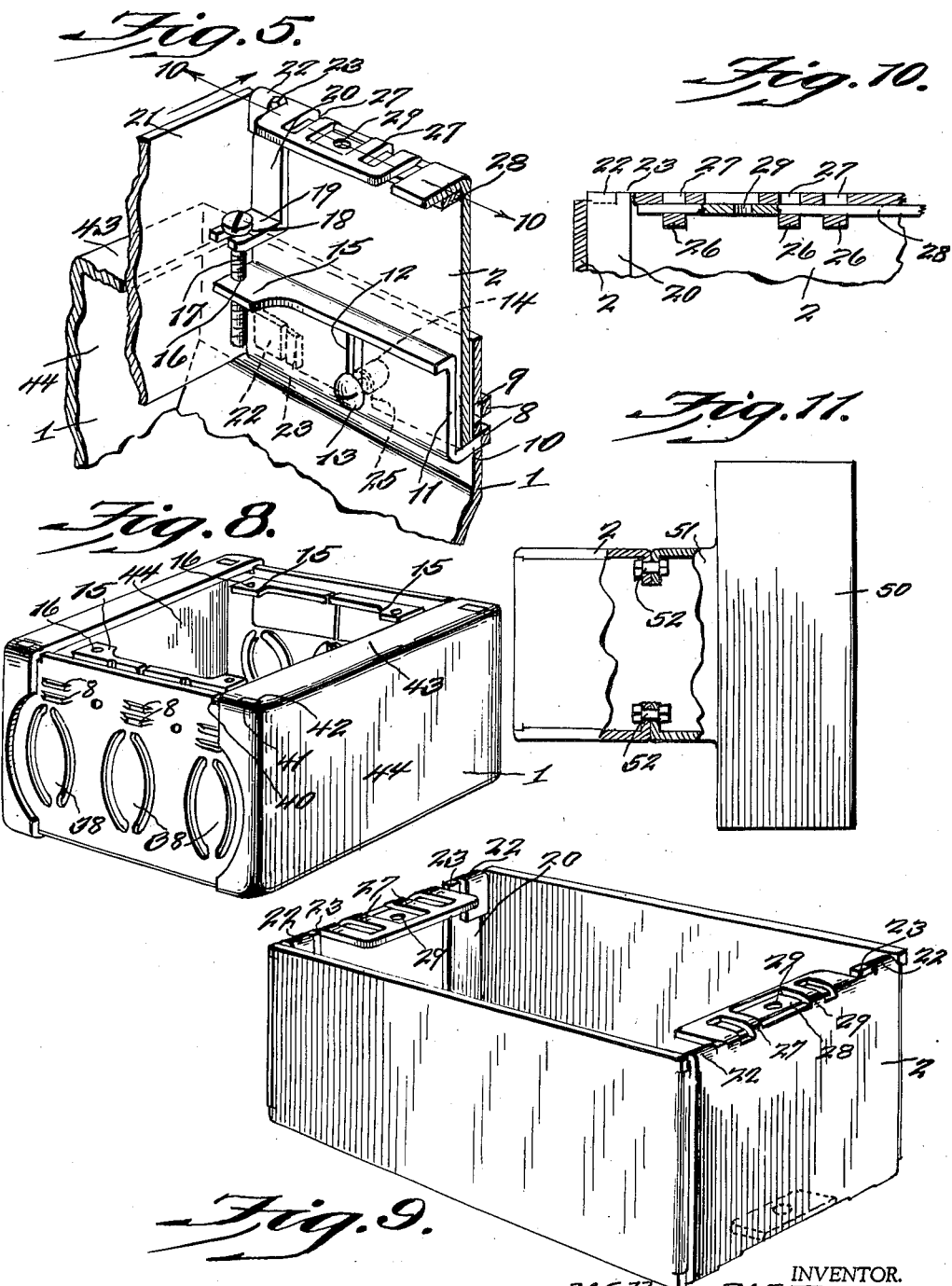

OUTLET BOX FOR ELECTRICAL INSTALLATION

Filed July 20, 1938  3 Sheets-Sheet 3

INVENTOR.
William W. Reese,
BY R. W. Boswell
his ATTORNEY.

Patented July 1, 1941

2,247,712

UNITED STATES PATENT OFFICE 2,247,712

OUTLET BOX FOR ELECTRICAL INSTALLATION

William W. Reese, Upper Darby, Pa.

Application July 20, 1938, Serial No. 220,357

2 Claims. (Cl. 220—3.7)

This invention relates to the art of electrical installation and particularly to an improved outlet box, to accommodate the usual switch, for use in connection with wiring. It sometimes occurs during the installation of outlet boxes, they are incorrectly positioned, as disclosed in the patent of William W. Reese on September 4, 1934, Patent 1,972,794, as shown in Figure 3 of said patent. Therefore, it is the purpose of the previous invention, the same as in the above identified patent, to provide means for correctly positioning a switch in the outlet box.

Another purpose is to provide an improved outlet box of a maximum extensible character to accommodate the box to a substantial wall thickness, in other words, a rough or foundation wall section, and a finishing wall section, in other words, a rough wall of brick, it may be either built up around the fixed section of the outlet box, or in which an opening may be cut to receive the fixed section of the box and then the finishing portion of the wall, subsequently to which the finishing portion of the wall is completed, either around the extensible section of the box, or an opening is formed therein to receive the extensible section. In this manner means are provided for rendering the extensible section adjustable to accommodate finishing thickness of the finished wall.

Another purpose is to provide in an outlet box, whereby the extensible section may be so arranged as to conform to the exterior surface of the finished wall, so as to accommodate the box to the usual facing plate, which may be positioned over the switch.

Another purpose is to provide, in an article of this character improved means over the former patent herein identified for mounting and rendering the extensible section of the box relative to the base or supporting section of the box, which is arranged in a depression or cavity formed in the rough brick construction of the wall, the extensible section being so mounted as to accommodate the entire outlet box to walls of various thicknesses.

It is another purpose to provide in an outlet box a base or supporting section of the box of a rectangular shape or polygonal shape in order to facilitate pulling through wires or electrical conductors to pass through bushing lined openings, without injury to insulated wires.

Still another purpose is to provide improved means for connecting and mounting the extensible section of the outlet box in association with the fixed section, said means being of vast improvement over that disclosed in the aforesaid identified patent. Said means being of such a character as would permit large or relatively small extensible sections to be mounted and supported, as shown in the drawings.

A further purpose is to provide a device of this kind which may be in the form of a single outlet box construction or gang arrangement, where there might be single switches or gang switches.

A still further purpose is to provide, in an outlet box means for holding the switch in different adjusted positions for accommodating the switch to outlet boxes, which may have been placed incorrectly in position in the wall, that is to say, slightly on an angle, so that when the facing plate is mounted in position, it will appear straight or properly positioned.

A still further purpose is to provide in an outlet box of this kind improved means for fastening the various sides and ends of the wall of the box together.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:

Figure 1 is a vertical sectional view through the rough brick work and the finished wall of the building structure, showing the improved outlet box installed and in section, with the usual wire containing conduits connected in place.

Figure 2 is a perspective view of a portion of the base or fixed section of the outlet box, that is a gang arrangement of the box.

Figure 3 is a sectional view of line 3—3 of Figure 2.

Figure 4 is a perspective view of portions of one of the end walls and one of the side walls and the base or fixed section of the box, showing how said walls may be interconnected.

Figure 5 is a perspective view of portions of one corner of the outlet box showing fragmentary parts of two end walls and 2 side walls of the fixed and extensible sections of the box.

Figure 6 is a view in elevation of an outlet box showing the mounting of a switch therein and illustrating how it may accommodate itself to an incorrectly positioned outlet box.

Figure 7 is a perspective view of an outlet box showing an increased size of extensible section of the box.

Figure 8 is a perspective view of the base section of an inter-connecting box.

Figure 9 is a perspective view of an extensible section of the box for the reception of a single switch.

Figure 10 is a sectional view on line 10—10 of Figure 5.

Figure 11 is a view in elevation of what is known as a back-box, namely, a base section which occupies a place in the rough brick work.

Figure 12 is a fragmentary detailed view showing a modified structure for mounting a switch.

Figure 13 is a sectional view on line 13—13 of Figure 12.

Figure 14 is a fragmentary perspective view of a portion of the base box section 1 showing a modified structure for mounting the plate 11.

Figure 15 is a sectional view on line 15—15 of Figure 14.

Referring to the drawings 1 identifies the base section of the outlet box and 2 is the extensible section and 3 the rough brick part of the wall, while 4 identifies the finishing section of the wall. The base section of the outlet box is located in a cavity 5 of the rough brick portion of the wall, and it has a wire containing conduit 6 connected as shown at 7 to the base section of the box by means of bushings. It is obvious that the base section of the outlet box may be rectangular in shape or polygonal. Portions of the side of the base or fixed sections are up or out-struck as shown at 8 to provide depressions or recesses 9, for the reception of lateral lugs 10 of the brackets or plates 11 in Figure 2 of the drawings. These lugs are at the ends of the flanges of the plates or brackets 11. By means of this construction the plates or brackets are supported in position and against movement the plates or brackets have vertical slots 12 which receives screws 13, on which spacing sleeves 14 are mounted. The sleeves 14 are between the plates or brackets 11 and the walls of the base or fixed section of the outlet box. The plates or brackets 11 at their ends are provided with ears 15, in openings 16 of which screws 17 as in Figure 1 are threaded. These screws 17 are swiveled in bifurcations 18 of lugs 19 formed with the lateral pieces 20 of the end walls 21 of the extensible section of the outlet box. The end walls 21 of the extensible section and the side walls of the extensible section have inter-locking connections comprising over-turned ears 22 and lugs 23 so as to provide a rigid extensible section of the outlet box. In order to mount the screws 17 swivelly into the lugs 19, collars 24 are threaded upon the screws, that is to say below the lugs 19, as more clearly shown in Figures 1–5.

The side walls of the extensible section of the outlet box engage between the brackets or plates 11 and the sides of the fixed or base section of the outlet box. The lower edge portions of the sides of the extensible section of the outlet box have notches 25, which straddle the spacing sleeves 14, which hold the brackets or plates 11 as spaced from the side walls of the fixed or base section of the box when the extensible section is so positioned. The screws 17 are then threaded in the openings 16 of the end lugs 15 of the plates or brackets 11, thereby extensively mounting the extensible section with relation to the fixed or base section. The upper edge portion of the side walls of the extensible section of the outlet box is laterally turned inwardly and is provided with up-struck portions 26, causing slots 27 to be formed and mounted between these up-struck portions of the lateral parts of the side walls of the extensible section of the box are bars 28 provided with threaded openings 29 into screws 30 are threaded. These screws also pass through a switch bar 31, which carries a conventional type of switch 32 similar to that in the herein mentioned patent. By tightening the screws 30, the bars 28 may be held in position, after they have been adjusted for the purpose of holding the switch bar 31 in different positions, to accommodate the position of the switch 32 relative to the extensible section of the outlet box. Screws 33 pass through an outer facing plate 34 through which the switch lever 35 passes. These bars are slidable when the screws 30 are loosened for the purpose of adjusting the switch 32 relative to the position of the outlet box, whether it is mounted in a straight or slightly angular position.

Suitable leads or conductor wires 36 pass through the conduits 6 and are connected at 37 to the switch 32.

It is obvious that the brackets or plates 11 are adjusted vertically, due to the provision of the recesses 8 and the slots 12.

Fixed or base section of the outlet boxes has the usual knock-out discs 38 which when removed cause openings to be formed in the sides and bottoms of the fixed or base section of the outlet box which openings being adapted to receive the conduits 6.

The sides of the base or fixed section of the outlet box adjacent the ends of the upper edges thereof have notches 40 and adjoining lugs 41, the latter engaging in openings 42, which are formed in the continuous flange 43 of the end walls 44 of the base section. In this manner an inter-locking connection is afforded between the end walls 44 and the side walls of the base section.

It is obvious that outlet boxes may be various shapes and sizes, either as single or in various gangs, it depending entirely upon the kind and construction of the electrical equipment being installed.

It is also obvious that such outlet boxes may be of various depths or as shallow as may be found necessary it depending upon the extensiveness of the equipment.

It is further obvious that the mountings of the cover or facing plates for the switch and the adjustability thereof as well as the mounting and the extensibility of the extensible section of the box, are common throughout the various forms of boxes.

Referring to Figure 11 there is disclosed a back-box which is designed to accommodate itself in a cavity in the rough brick work of the wall, it having an extension 51 to which an extensible section 2 may be bolted as shown at 52, otherwise the extensible section comprises the characteristic structure as embodied in the other figures of the drawings.

Figure 12 discloses a modified structure for mounting a switch bar 31—A on the extensible box section 2, in this structure the extensible box section 2 is provided with a lateral extension 53 provided with a curved slot 54 in which an angular element 55 is mounted. A screw 56 engages through the end of the bar 31—A and is threaded in the angular element 55. A lateral portion 57 of which engages under the lateral extension 53, so that by tightening up on the screw 56, the lateral portion 57 tightens against the extension 53 and thereby binds the switch bar 31—A in position. That portion of the angular element 55 engaging in the slot 54 is rectangular in cross-section so as to prevent the angular element from turning.

Referring to Figures 14 and 15 the plate 11 has a lateral flange 11a with an extension 11b which engages through the wall of the base box section 1 and peened over as shown at 11c to secure the plate 11 in position.

The invention having been set forth, what is claimed is:

1. In an outlet box having a fixed box section and an extensible box section corresponding to and telescopically mounted in the fixed box section, an L shaped bracket plate mounted on a side wall of the fixed box section, adjacent to its upper edge, and adjacent to one corner thereof, each end of each side wall of the extensible box section having upper and lower lugs, the upper and lower edges of the end wall of the extensible box section adjacent the corners thereof having over-turned ears interengaging said lugs to hold the structure of the extensible box section rigid, means connecting one of said lugs with the bracket plate to hold the extensible box section mounted on the fixed box section.

2. In an outlet box having a fixed section and an extensible box section corresponding to and telescopically mounted in the fixed box section, said extensible box section comprising side and end walls, the latter having upper and lower lugs provided with notches, the upper and lower edges of the former having overturned ears engaging said notches, and swivel means carried by the upper lugs for fastening the extensible box section to an element or a part of the fixed box section.

WILLIAM W. REESE.